US012751805B2

(12) United States Patent
Gottenbos et al.

(10) Patent No.: US 12,751,805 B2
(45) Date of Patent: Oct. 6, 2026

(54) SUBGINGIVAL CLEANING

(71) Applicant: KONINKLIJKE PHILIPS N.V., Eindhoven (NL)

(72) Inventors: Bart Gottenbos, Budel (NL); Manu Goudar, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 593 days.

(21) Appl. No.: 18/034,538

(22) PCT Filed: Oct. 25, 2021

(86) PCT No.: PCT/EP2021/079449

§ 371 (c)(1),
(2) Date: Apr. 28, 2023

(87) PCT Pub. No.: WO2022/090107

PCT Pub. Date: May 5, 2022

(65) Prior Publication Data

US 2023/0404724 A1 Dec. 21, 2023

(30) Foreign Application Priority Data

Oct. 29, 2020 (EP) .................................... 20204741

(51) Int. Cl.
*A61C 17/02* (2006.01)
*A61C 17/028* (2006.01)

(52) U.S. Cl.
CPC ........ *A61C 17/0217* (2013.01); *A61C 17/028* (2013.01)

(58) Field of Classification Search
CPC ... A61C 17/005; A61C 17/02; A61C 17/0202; A61C 17/0217; A61C 17/028
See application file for complete search history.

(56) References Cited

U.S. PATENT DOCUMENTS 3,874,083 A 4/1975 Buckley
4,164,940 A 8/1979 Quinby
(Continued)

FOREIGN PATENT DOCUMENTS

CN 105050536 A 11/2015
EP 2037836 B1 * 3/2017 ......... A61C 17/0202
(Continued)

OTHER PUBLICATIONS

International Search Report and Written Opinion dated Jan. 17, 2022 for International Application No. PCT/EP2021/079449 filed Oct. 25, 2021.

*Primary Examiner* — Shaun R Hurley

(57) ABSTRACT

A subgingival cleaning system (10) for cleaning a subgingival region such as a periodontal pocket is disclosed. The system comprises a liquid flow source (60) for producing a liquid flow and a gas flow source (70) for producing a gas flow. Each of the liquid flow source and the gas flow source are coupled to a nozzle arrangement (40) arranged to be aimed at a subgingival region to be cleaned, the nozzle arrangement comprising at least one nozzle (41, 42, 43). The system is configured to produce a fluid stream comprising a series of liquid pulses from said liquid flow source, said liquid pulses each having a duration of 5-100 ms, preferably 8-40 ms, with an interval of 1-50 ms, preferably 2-10 ms, between subsequent liquid pulses; and a gas flow from said gas flow source at least partially filling said intervals. Also disclosed is a nozzle arrangement for forming such a subgingival cleaning system.

15 Claims, 14 Drawing Sheets

10

(56) References Cited

U.S. PATENT DOCUMENTS

| | | | |
|---|---|---|---|
| 4,906,187 A | 3/1990 | Amadera | |
| 6,048,200 A | 4/2000 | Martin et al. | |
| 10,368,966 B2 | 8/2019 | Zhang et al. | |
| 2017/0056142 A1 * | 3/2017 | Baragona | A61C 17/0202 |
| 2018/0344440 A1 | 12/2018 | Dorward et al. | |
| 2020/0276003 A1 | 9/2020 | Luettgen et al. | |

FOREIGN PATENT DOCUMENTS

| | | | |
|---|---|---|---|
| EP | 2967777 B1 * | 5/2017 | A61C 17/022 |
| WO | 2013001520 A2 | 1/2013 | |
| WO | 2016051301 A1 | 4/2016 | |
| WO | 2019081268 A1 | 5/2019 | |
| WO | 2021063827 A1 | 4/2021 | |

* cited by examiner

100

SUBGINGIVAL CLEANING

This application is the U.S. National Phase application under 35 U.S.C. § 371 of International Application No. PCT/EP2021/079449, filed on Oct. 25, 2021, which claims the benefit of EP application Ser. No. 20/204,741.1, filed Oct. 29, 2020. These applications are hereby incorporated by reference herein.

FIELD OF THE INVENTION

The present invention relates to a subgingival cleaning system comprising a liquid flow source coupled to a nozzle arrangement arranged to be aimed at a subgingival region to be cleaned, the nozzle arrangement comprising at least one nozzle.

The present invention further relates to a nozzle arrangement for cleaning such a subgingival region.

BACKGROUND OF THE INVENTION

Periodontitis is a gum infection with a high incidence worldwide. For example, in the USA, nearly half (46%) of adults over 30 years old have been diagnosed with periodontitis, which raises a public health concern. Periodontitis is irreversible due to breakdown of teeth-supporting tissues that do not completely restore. This results in the gums detaching from the teeth, forming a gap between the teeth surface and the gum. This gap, known as the periodontal pocket, forms a favorable niche for specific bacteria species to grow, which can cause tooth loosening or even tooth loss upon progression of the gum disease.

Next to the large population of patients being diagnosed with periodontitis, there is another large population which suffers periodontitis or early pocket formation without being recognized by the patients or professionals. For these patients, extra oral hygiene is critically important to prevent such pockets from further progressing and deepening, which eventually can lead to severe periodontitis conditions.

The golden standard treatment for periodontitis is professional scaling and root planing. This treatment involves the experienced hand of the dental professional to debride the tooth and root surface from calculus and biofilm. For successful treatment, patients are enrolled in a maintenance therapy with return for professional cleaning every 3-4 months. Studies show a low compliance of patients (16%) to commit to a one-hour appointment for a 5-14 years' maintenance treatment. Fear of dentist, economical factors and behavior of dental professionals have been cited as reasons for the low compliance. Therefore, there is a strong need for home cleaning devices for pocket cleaning maintenance therapy. Additionally, such home cleaning devices ideally can be used to prevent initial pockets from progressing, even before professional treatment of scaling and root planing is needed.

The removal target for subgingival cleaning can be divided in multiple sections:

Sub-gingival calculus attached to the tooth root. This can only be removed professionally.

Sub-gingival plaque, divided in multiple layers:

a) Basal layer: directly adhering to the root surface. This layer contains mainly bacteria not related to gum disease (benign commensals). This layer typically exhibits a high tenacity.

b) Intermediate layer containing mainly filamentous or rod shaped cells. This layer (sometimes referred to as the orange complex) is associated with gingivitis and exhibits intermediate tenacity.

c) Top layer, which contains mainly filamentous, rod-shaped or even coccoid type cells. This layer (sometimes referred to as the red complex) is associated with periodontitis and is soft, with low tenacity.

d) An additional loose layer of bacteria covering the adhering biofilm has been reported by several sources, which are species strongly associated with periodontitis.

Sub-gingival fluid: gingival crevicular fluid (GCF) is formed inside sub-gingival crevices and pockets, and its formation rate increases with increased inflammation and pocket depth. Bacterial toxins and other bacterial by-products can accumulate in GCF.

It can be hypothesized that in combination with occasional professional calculus and strong basal layer removal it is sufficient for a home cleaning device to remove the fluid containing the toxins and the softer top layers, which harbor most of the strong periodontal pathogens. As periodontal pathogens grow slowly and typically need 2 to 3 days to grow back, cleaning once a day or on alternating days should be sufficient. However, for a successful cleaning regime, the full depth of the pocket has to be cleaned from pathogens to arrest the process of gum detachment taking place at the pocket rim. The deep reach is one of the key challenges for successful cleaning technologies.

An example of such a home cleaning device is disclosed in US 2020/276003 A1, which discloses an oral irrigator including a reservoir, a tip fluidly connected to the reservoir, a motor having a drive shaft, and a pump. In use, a water jet is generated through the tip by the pump and aimed by the user at his or her interdental cavities to perform subgingival cleaning, e.g. of subgingival periodontal pockets.

However, it has been found that such oral irrigators can be ineffective for periodontal pocket cleaning, even when using special subgingival irrigator tips. For example, for moderate periodontitis patients, which is the largest group in the population affected by periodontitis, the deepest pocket is defined as 5 mm deep and it was found that such water jet based oral irrigators can fail to clean the full depth of such periodontal pockets, especially when used under an inappropriate aiming angle, thereby limiting the effectiveness of the cleaning process performed with such oral irrigators. Although correct aim improves the effectiveness of the cleaning process of such oral irrigators, different subgingival regions, e.g. buccal and lingual regions, may require different optimal aiming angles, which may be difficult to achieve by a user. In addition, effective cleaning of such relative deep periodontal pockets can take up to 750 ml of water and 140 s of treatment time, which are unsatisfactory from a user's perspective and can discourage user compliance with the required cleaning regime.

WO 2013/001520 discloses an oral hygiene apparatus which can be controlled to deliver either a jet of air or a jet of air and liquid. This is found to assist in the removal residual food and plaque.

SUMMARY OF THE INVENTION

The present invention seeks to provide a subgingival cleaning system that can achieve more effective periodontal pocket cleaning. The present invention further seeks to provide a nozzle arrangement for more effective periodontal pocket cleaning. The invention is defined by the independent claims. The dependent claims define advantageous embodiments.

According to an aspect, there is provided a subgingival cleaning system a liquid flow source and a gas flow source each fluidly coupled to a nozzle arrangement arranged to be aimed at a subgingival region to be cleaned, the nozzle arrangement comprising at least one nozzle, wherein the liquid flow source is arranged to produce a liquid flow comprising a series of liquid pulses through said nozzle arrangement; and the gas flow source is arranged to produce a gas flow through said nozzle arrangement such that each liquid pulse is followed by said gas flow.

The present invention is based on the insight obtained from simulations that liquid jet speeds inside the periodontal pocket rapidly decrease with increasing pocket depth due to the fact that the liquid jet has to penetrate a liquid column, e.g. a 5 mm high column in a periodontal pocket of a patient suffering from moderate periodontitis, which causes a loss of momentum due to surface drag by the dental walls and the liquid column, thereby reducing liquid velocity. Removal of the liquid column from the periodontal pocket by the gas between the liquid pulses ensures that a newly arriving liquid pulse can penetrate the depth of the periodontal pocket with increased velocity whilst requiring less liquid due to the pulsed nature of the liquid stream. Consequently, a subgingival cleaning system is provided that offers improved cleaning of periodontal pockets with less water and in a shorter period of time compared to water irrigation cleaning devices.

In order to achieve such more efficient cleaning performance, the liquid pulses each have a duration of 5-100 ms, preferably 8-40 ms, and the intervals between the liquid pulses each have a duration of 1-50 ms, preferably 2-10 ms. The liquid pulses preferably are generated at a cycle frequency of 20-100 Hz. If the duration of each liquid pulse is less than 5 ms, effective cleaning of the subgingival region may be compromised, whereas if the duration of each liquid pulse is more than 100 ms, the cleaning operation performed with the subgingival cleaning system may take too long and/or use too much liquid. Similarly, if the gas is provided to the subgingival region to be cleaned during an interval between liquid pulses of less than 1 ms, effective removal of the liquid column from the subgingival region to be cleaned may not be achieved, whereas if the gas is provided to the subgingival region to be cleaned for more than 50 ms, the cleaning operation performed with the subgingival cleaning system may take too long. Limiting the duration of each liquid pulse to 8-40 ms and the duration of each interval to 2-ms during which the gas flow is directed at the subgingival region to be cleaned provides a particularly optimal performance window for the subgingival cleaning system.

In a preferred embodiment, the liquid is water and/or the gas is air to facilitate a particularly straightforward implementation of the subgingival cleaning system. Where reference is made to water, this may also mean water-based cleaning agents, e.g. a mouthwash or the like.

In an embodiment, the nozzle arrangement comprises a single nozzle, and wherein the liquid flow source and the gas flow source optionally are fluidly coupled to the single nozzle via a switch arranged to switch between the liquid flow and the air flow. In this embodiment, both the liquid stream and gas stream are alternating pulsed streams that pass through the same nozzle when being delivered to the subgingival area to be cleaned. This is a relatively low-cost implementation of the nozzle arrangement, although it comes at the trade-off of requiring the removal of liquid remaining in the nozzle by the gas when switching from the liquid stream to the gas stream, such that effective removal of the liquid column in the periodontal pocket can take longer due to the fact that the delivery of the full air pulse pressure may be delayed by the initial removal of liquid from the nozzle. Such switching between the fluid stream and the gas stream may be achieved using a switch or alternatively by insertion of the gas stream in the pulsed liquid stream upstream from the single nozzle orifice.

In an alternative embodiment, the nozzle arrangement comprises a first nozzle fluidly coupled to the liquid flow source and a second nozzle fluidly coupled to the gas flow source. This has the advantage that the gas stream can be delivered to the subgingival region for cleaning without delays caused by residual water having to be removed from the nozzle through which the gas stream flows, thereby further reducing the cycle time required for effective cleaning of the subgingival site.

The nozzle arrangement may comprise a concentric nozzle arrangement in which one of the first nozzle and second nozzle envelopes the other of the first nozzle and second nozzle, e.g. the second nozzle may envelop the first nozzle. This provides a particularly compact nozzle design in which both nozzles are aligned to aim at the subgingival region to be cleaned. Alternatively, the first nozzle and the second nozzle may be spatially separated from each other, e.g. may aim at the subgingival region to be cleaned from opposite directions, to ensure effective cleaning of this region.

The gas flow from the gas flow source may comprise a plurality of gas pulses, each gas pulse at least partially following one of said liquid pulses, e.g. each having the duration of said interval in between said liquid pulses, or alternatively the gas flow from said gas flow source may be a continuous gas stream. In case of a continuous gas stream, the gas pressure is kept low enough, e.g. at most 0.1 bar, to prevent decomposition of the liquid pulses into droplets.

In a particular embodiment, the liquid flow source comprises a liquid reservoir fluidly coupled to the nozzle arrangement through a fluidic coupling comprising a liquid pump such that the liquid pulses may be generated through activating the liquid pump for a defined period of time, e.g. for the duration of the liquid pulse to be generated.

Preferably, the generated liquid pulses should closely resemble a block wave in the sense that the liquid pulses should tail off quickly, as this improves the cleaning efficiency of the liquid pulses. In one embodiment, a low pressure tail of the liquid pulses is avoided by the fluidic coupling, the liquid reservoir and the nozzle arrangement being non-expandable, as such a non-expandable positive pressure system for the liquid promotes a sharp drop in liquid pressure upon termination of the generation of the liquid pulses due to the prevention of volumetric changes in the positive pressure system during liquid pulse generation. Alternatively or additionally, the fluidic coupling between the liquid flow source and the nozzle arrangement comprises an active stop under control of a controller to terminate a liquid stream from the liquid flow source to the nozzle arrangement in order to achieve the sharp cut-off of the liquid pulse. Such an active stop may take the shape of a valve such as a blocking valve or a pressure release valve or a piston such as a pull-back piston that sucks the liquid out of the nozzle arrangement.

The gas stream may be generated in a number of ways. In an embodiment, the gas flow source comprises an air piston within the nozzle arrangement, said air piston being driven by liquid pressure generated by said liquid flow source causing said air piston to draw air into the nozzle arrangement. This is a particularly cost-effective solution in embodiments in which the gas stream is pulsed, as the gas pulses may be generated before the liquid pulses in such an arrangement upon the liquid pulses travelling towards the nozzle arrangement.

Alternatively, the gas flow source may comprise a gas pump or a gas canister, which for example is useful in embodiments in which the gas stream is continuous, although such a gas pump or gas canister of course may be equally used to generate a pulsed gas stream.

In an embodiment, the gas pump is integrated the nozzle arrangement, which has the advantage that the gas pump may be fitted onto an existing subgingival cleaning system by attaching the nozzle arrangement to such a system.

According to another aspect, there is provided a nozzle arrangement for a subgingival cleaning system arranged to generate a stream of liquid pulses, the nozzle arrangement comprising a conduit for receiving said liquid pulses and a compartment comprising an air inlet valve and a pressure release valve, each of the conduit and the compartment terminating in an orifice of the nozzle arrangement, wherein the compartment comprises a pressuring arrangement responsive to liquid pressure generated by said liquid pulses for pressuring the air within the compartment in order to generate a stream of air pulses through said pressure release valve, each air pulse at least partially following one of said liquid pulses. Such a nozzle arrangement may be deployed with an existing subgingival cleaning system generating liquid pulses in order to improve the cleaning performance of such as system by the generation of air pulses in addition to the liquid pulses, which air pulses can remove the water column from the subgingival region to be cleaned as previously explained.

A method of cleaning a subgingival region may also be provided, such method comprising aiming a fluid stream at said subgingival region, said fluid stream comprising a series of liquid pulses; and a gas flow following each liquid pulse, wherein said gas flow comprises a plurality of gas pulses, e.g. each having the duration of an interval in between subsequent liquid pulses, or is a continuous gas stream. It has been found that such a cleaning method effectively removes those contaminants from the subgingival region that are most likely to cause periodontitis, such that periodic use of this method, e.g. every day or every other day, can contribute to controlling periodontitis in patients.

BRIEF DESCRIPTION OF THE DRAWINGS

Embodiments of the invention are described in more detail and by way of non-limiting examples with reference to the accompanying drawings, wherein:

FIG. 9 schematically depicts a nozzle arrangement for converting an existing subgingival cleaning system into a subgingival cleaning system according to an example embodiment, wherein

DETAILED DESCRIPTION OF THE EMBODIMENTS

Figure 1:
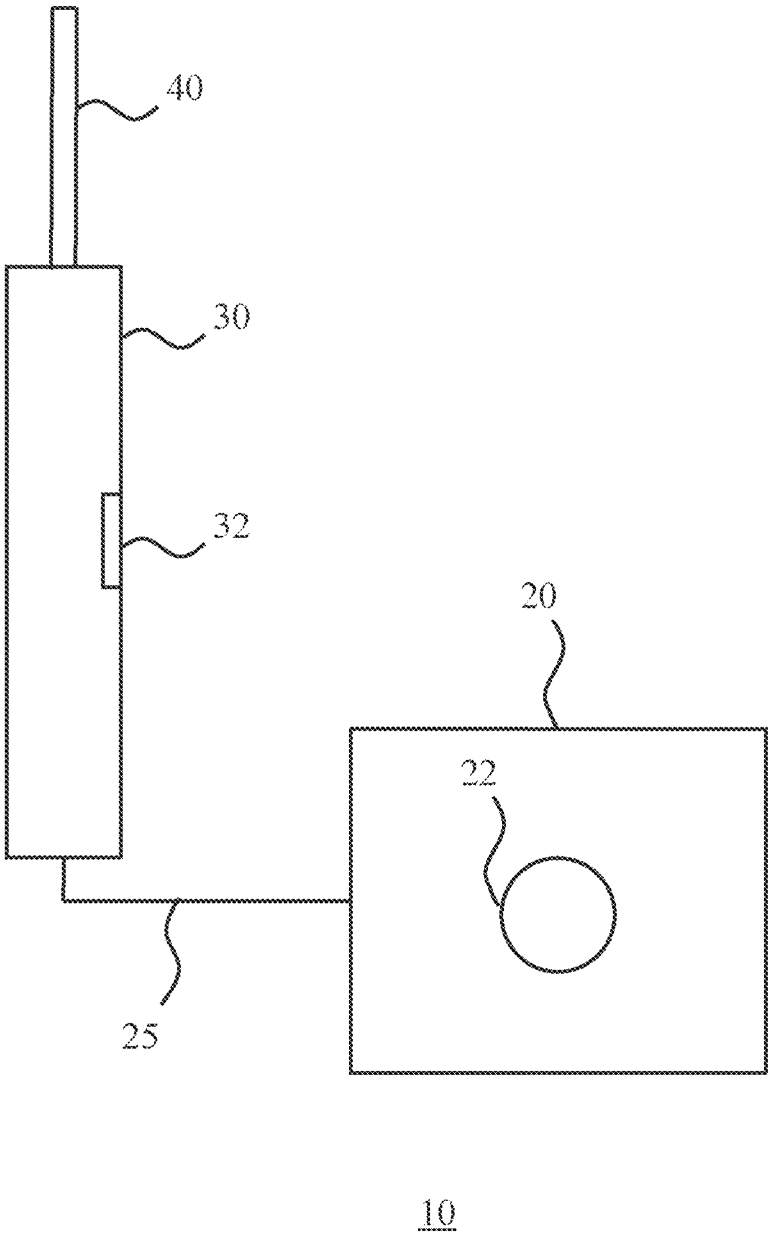
FIG. 1 schematically depicts a subgingival cleaning system according to an embodiment.

It should be understood that the Figures are merely schematic and are not drawn to scale. It should also be understood that the same reference numerals are used throughout the Figures to indicate the same or similar parts.

FIG. 1 schematically depicts a subgingival cleaning system 10 according to an embodiment of the present invention. The subgingival cleaning system 10 comprises a base unit 20 and a handheld unit 30 fluidly connected to the base unit 20 through tubing 25. The base unit 20 may comprise a user interface 22 such as a dial or knob through which a user may select a mode of operation of the subgingival cleaning system 10. The handheld unit 30 comprises a nozzle arrangement 40 having one or more nozzles through which a fluid stream may be aimed at a subgingival region to be cleaned by the user. The handheld unit 30 may comprise a switch 32 for enabling/disabling such a fluid stream. In accordance with the present invention, the subgingival cleaning system 10 comprises a mode of operation (which may be its only mode of operation or may be one of a plurality of modes of operation) in which a fluid stream is generated through the nozzle arrangement 40, which fluid stream comprises of a plurality of liquid pulses separated by gas. The gas may be a continuous gas stream or may be a pulsed gas stream such that the fluid stream through the nozzle arrangement 40 consists of a sequence of liquid pulses interspersed with gas pulses. In alternative embodiments, the base unit 20 may be omitted as a separate entity and its functionality may be integrated in the handheld unit 30.

It has been found that contamination within periodontal pockets having a depth of 5 mm or more that contributes to periodontal disease such as the top plaque layer, the additional loose layer of bacteria covering the adhering biofilm and the sub-gingival fluid: gingival crevicular fluid can be removed more effectively with such liquid pulses separated by gas, e.g. gas pulses or a continuous gas stream, compared to a continuous liquid stream. As previously explained, this can be understood by the removal of accumulated liquid from the periodontal pocket by the air, thereby reducing drag and providing improved access to the deeper regions of such periodontal pockets of subsequent liquid pulses. Particularly effective cleaning of the periodontal pocket is achieved when the liquid pulses have a duration in the range of 5-100 ms and preferably 8-40 ms (milliseconds) and are temporally separated by an interval having a duration in a range of 1-50 ms, preferably 2-10 ms, preferably giving the fluid stream a cycle frequency in the range of 20-100 Hz. As will be readily understood by the skilled person, where the gas stream is a pulsed gas stream, the duration of each interval defines the duration of the gas pulses. In a preferred embodiment, the duration of such an interval, e.g. the gas pulses, is in a range of 2-4 ms. The effects and advantages of such a pulsed fluid stream on the cleaning of periodontal pockets will be demonstrated in further detail below. In embodiments of the present invention, the liquid may be water and the gas may be air, but alternatives may be contemplated. For instance, the liquid may be a water-based cleaning liquid, water, or any other suitable liquid, whereas the gas may be provided from a gas canister or the like and may be any suitable gas, e.g. compressed air or nitrogen.

Figure 2:
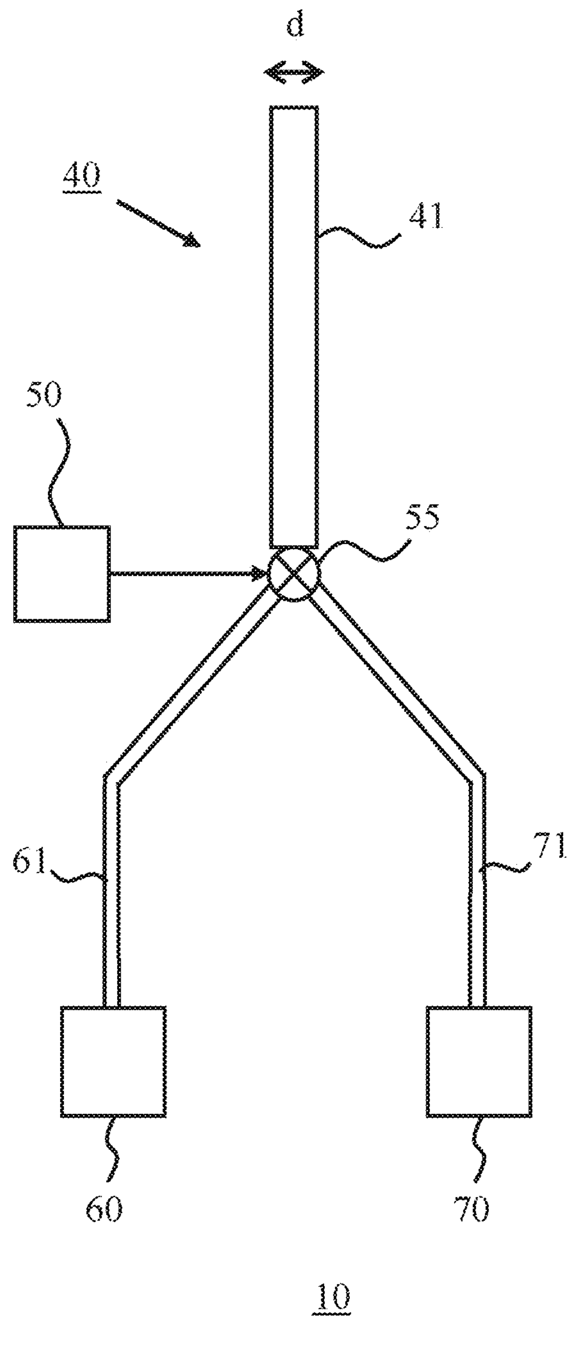
FIG. 2 schematically depicts an aspect of a subgingival cleaning system according to another embodiment.

In an embodiment depicted in FIG. 2, the nozzle arrangement 40 comprises a single nozzle 41. The single nozzle 41 is fluidly connected to the liquid flow source 60 through tubing 61 and the switch 55 and is connected to the gas flow source 70 through tubing 71 and the switch 55. The switch may be controlled by a controller 50, which periodically switches between the liquid flow source 60 and the gas flow source 70 in order to generate the pulsed fluid stream with alternating liquid and gas pulses as explained above. Alternatively, the switch 55 may be an automated valve or a valve responsive to the liquid pressure and gas pressure produced by the liquid flow source 60 and the gas flow source 70 respectively such that the fluid stream, e.g. liquid flow or gas flow, having the higher pressure causes the switch the open. The nozzle 41 may have any suitable diameter d, e.g. a diameter in a range of 0.1-1 mm. The smaller the diameter, the less liquid is required for the subgingival cleaning operation. The larger the diameter, the shorter the duration of the subgingival cleaning operation. In this embodiment, the duration of the gas pulses preferably is in the range of 5-20 ms in order to allow for the expulsion of residual liquid from the single nozzle 41 prior to the effective removal of the liquid column from the periodontal pocket, as the residual liquid present in the nozzle 41 may disturb the gas pockets and compromise the effective removal of the liquid column from the periodontal pocket.

In another set of embodiments, the switch 55 may be omitted from the single nozzle design. For example, both the liquid flow source 60 and the gas flow source 70 may be directly fluidly connected to the single nozzle 41, with the gas flow source 70 producing a gas flow at a pressure below the peak pressure of the liquid pulses generated by the liquid flow source such that upon generation of a liquid pulse having a higher pressure than the gas flow, the liquid pulse is forced through the single nozzle 41, whereas upon termination of the liquid pulse, causing the liquid flow pressure to drop below the gas flow pressure, e.g. to about 0 bar, the gas flow can now exit the single nozzle 41 such that the fluid stream produced at the output of the single nozzle 41 comprises a stream a liquid pulses interspersed with a gas flow to remove the liquid column from the periodontal pocket as previously explained. In order to minimize the nozzle volume to be cleared of liquid by the gas flow in between liquid pulses, the gas flow preferably enters the nozzle 41 proximal to its orifice. A one-way valve may be present at this point of entry to prevent liquid from entering the branch of the nozzle arrangement through which the gas flow enters the part of the single nozzle 41 shared with the liquid flow.

If the gas flow and the liquid flow share a larger path through the single nozzle 41, the gas flow and the liquid flow may be alternating flows having the same pressure in the nozzle lumen. This has the advantage that the removal of the liquid from the periodontal pocket requires less time, but has the disadvantage that a gas pressure higher than strictly necessary for the liquid removal from the periodontal pocket is deployed, which comprises the energy efficiency of the subgingival cleaning system 10.

Figure 3:
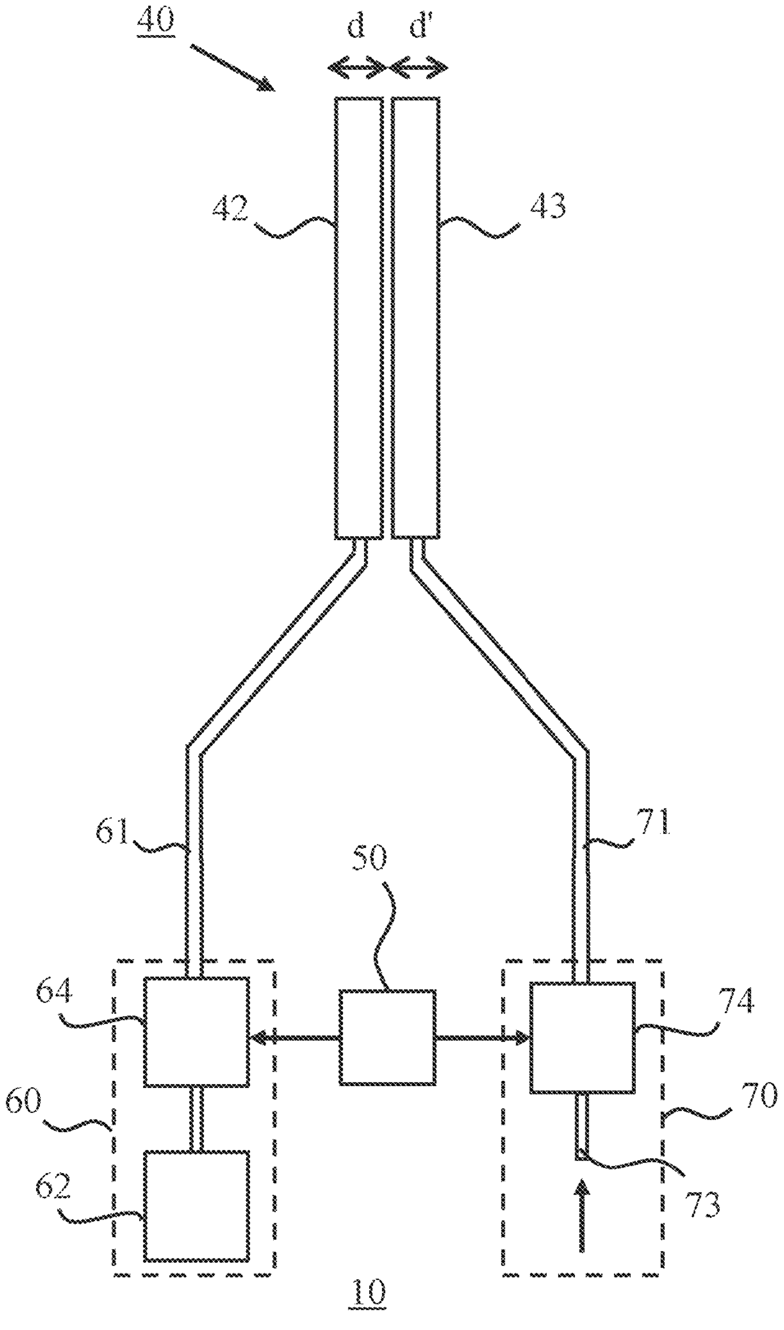
FIG. 3 schematically depicts an aspect of a subgingival cleaning system according to yet another embodiment.

In another embodiment depicted in FIG. 3, the nozzle arrangement 40 comprises a first nozzle 42 fluidly coupled to the liquid flow source 60 through the tubing 61 and a second nozzle 43 fluidly coupled to the gas flow source 70 through the tubing 71. The liquid flow source 60 may comprise a liquid pump 64, e.g. a water pump, arranged to pump liquid from a liquid reservoir 62 to the first nozzle 42, whereas the gas flow source 70 may comprise a gas pump 74, e.g. an air pump, arranged to draw gas (here air) into the tubing 71 through inlet 73. The controller 50 may be arranged to control the liquid flow source 60, e.g. the liquid pump 64, and the gas flow source 70, e.g. the gas pump 74, to generate the fluid flow comprising the liquid pulses separated by air as explained above. Alternatively, the gas pump 74 may be responsive to liquid pressure produced by the liquid pump 64 as will be explained in more detail below. The liquid pump 64 and the gas pump 74 may take any suitable shape, e.g. a piston or plunger pump. As such pumps are well-known per se, they will not be described in further detail for the sake of brevity only. It is furthermore noted that although the gas pump 74 is shown as a separate entity, this is by way of non-limiting the example only and it is for example equally feasible to incorporate the air pump 74 in the water flow source 70. In this embodiment, the gas flow may be pulsed or may be continuous. With a continuous gas flow, care has to be taken that the gas flow does not disrupt the liquid pulses, which may be achieved by limiting the gas flow velocity at the tip of second nozzle 43 to 100 m/s or to a pressure of 0.1 bar at this tip. For a pulsed gas stream, a higher gas velocity at the tip of the nozzle 43 may be used, which therefore has the advantage of more rapid removal of the liquid column from the periodontal pocket, which therefore may contribute to a shorter duty cycle (higher frequency) of the pulsed fluid stream, thus reducing overall cleaning time for a patient. The first nozzle 42 may have a tip diameter d in a range of 0.1-1 mm and the second nozzle 43 may have a tip diameter d' in a range of 0.1-1 mm. The diameters d and d' may be the same or may be different.

Figure 6:
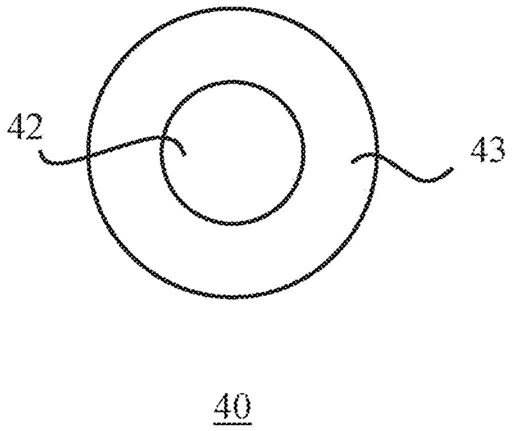
FIG. 6 schematically depicts an aspect of a subgingival cleaning system according to yet another embodiment.

The first nozzle 42 and the second nozzle 43 are typically arranged such that they both aim at the subgingival region e.g. a periodontal pocket, to be cleaned. To this end, the first nozzle 42 and the second nozzle 43 may be closely aligned or alternatively, the first nozzle 42 and the second nozzle 43 aim at the subgingival region to be cleaned from opposite sides of this region, which for instance may assist in the correct aim of the nozzle arrangement 40 at the subgingival region to be cleaned. In a particular embodiment, which is schematically depicted in FIG. 6, the nozzle arrangement 40 is a concentric nozzle arrangement in which the second nozzle 43 envelops the first nozzle 42. Of course, the first nozzle 42 may envelop the second nozzle 43 instead although it is preferred that the liquid pulses are delivered through the inner nozzle of the concentric nozzle arrangement 40 as this ensures particularly concentrated liquid pulses being delivered to subgingival region to be cleaned, which aids efficient cleaning of this region.

The cleaning efficiency of the liquid pulses is further improved by controlling the shape of the liquid pulses. The liquid pulse train preferably resembles a block wave, with the pressure tail of the liquid pulses being minimized as much as possible, as a relatively long tail where the pressure of the liquid pulses slowly drops off reduces the cleaning efficiency of such liquid pulses. The tail of the liquid pulses may be suitably shaped in a number of suitable manners. For instance, the positive pressure system including the liquid reservoir 62, the tubing 61 and the nozzle arrangement 40 may be non-expandable such that upon the liquid pump 64 being disengaged, the pressure in the tubing 61 rapidly drops away as the positive pressure system cannot expand during the preceding pumping of the liquid by the liquid pump 64, and therefore will not contract when the liquid pump 64 is switched off. Such contractions can apply a residual pressure on the liquid stagnant in the tubing 61 causing the pressure tail in the liquid pulses, and therefore avoiding such contractions by using a non-expandable pressure system avoids the generation of such pressure tails.

Figure 4:
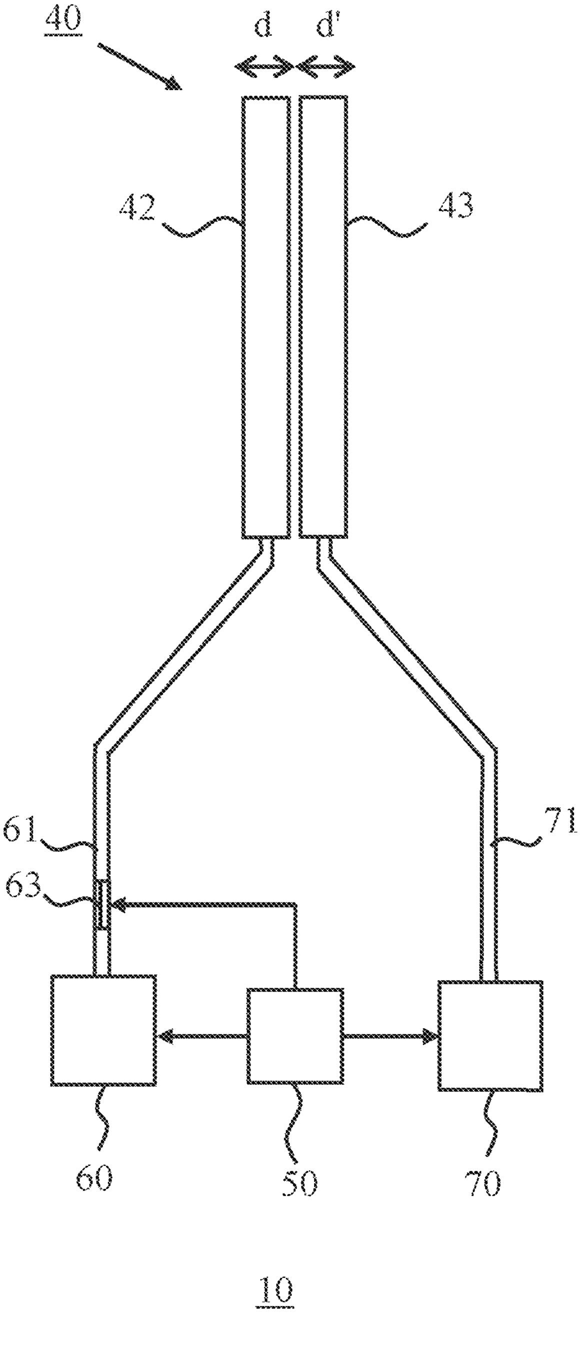
FIG. 4 schematically depicts an aspect of a subgingival cleaning system according to yet another embodiment.

Alternatively or additionally, the fluid path from the liquid flow source 60 to the nozzle arrangement 40 may comprise an active stop 63 under control of the controller 50, e.g. located within the tubing 61 as schematically depicted in FIG. 4. Activation of the active stop 63 at the end of a liquid pulse generation period abruptly stops the flow of liquid from the liquid flow source 70 to the nozzle arrangement 40, thereby avoiding the long pressure drop tails of such liquid pulses. Such an active stop 63 may be implemented in a number of suitable ways. For example, the active stop 63 may be a valve such as a blocking valve or a pressure release valve. Alternatively, the active stop 63 may be a pull-back piston. Such a pull-back piston may be located in a branch of the tubing 61 and may be pulled pack in order to create a negative pressure in the tubing 61, thereby preventing the liquid from exiting the first nozzle 42. The pull-back piston alternatively may form part of the liquid pump 64, e.g. be the same piston used to generate the liquid pressure during activation of the liquid pump 64 to form the liquid pulses, with the piston being moved in the opposite direction to draw the liquid in the tubing 61 and the second nozzle 42 back towards the liquid reservoir 62, thereby quickly dropping the liquid pressure in the tubing 61.

Figure 5:
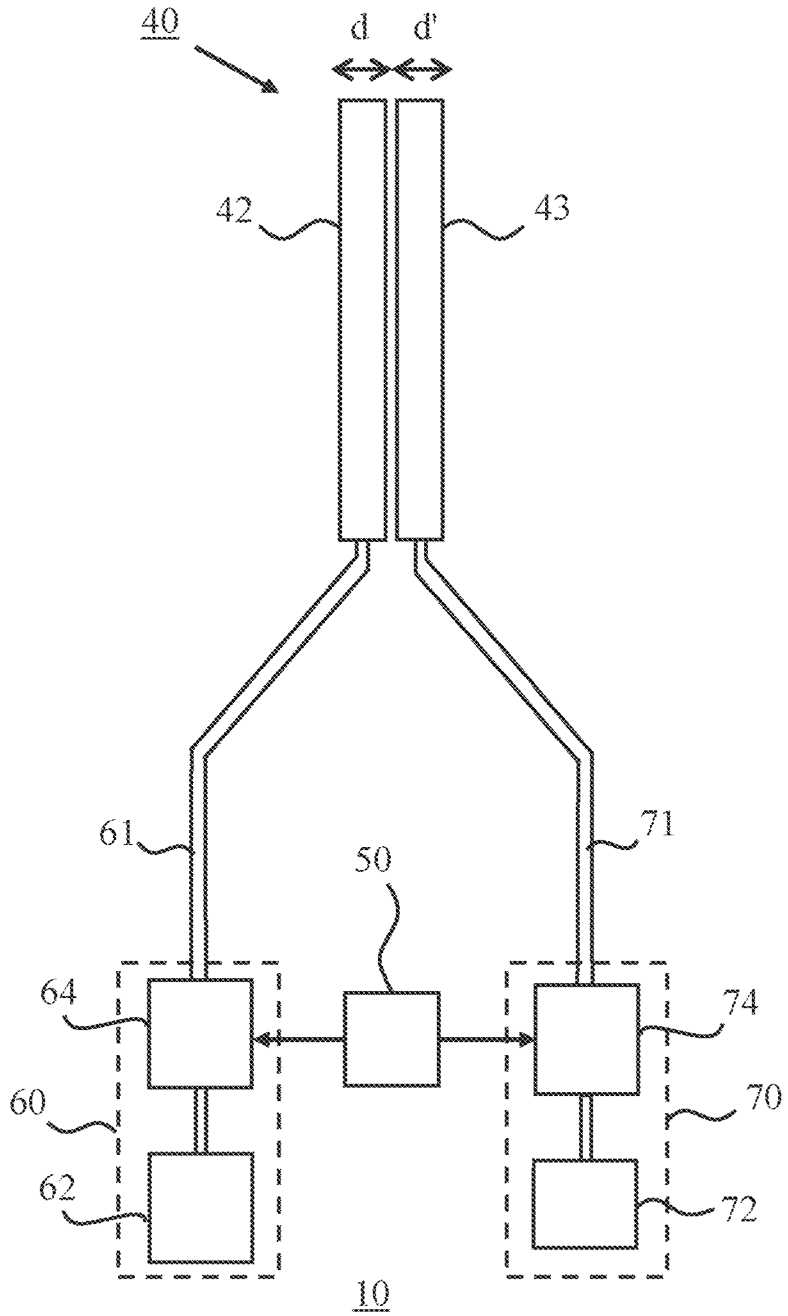
FIG. 5 schematically depicts an aspect of a subgingival cleaning system according to yet another embodiment.

In the subgingival cleaning system 10 according to embodiments of the present invention, the gas pressure may be generated in a number of suitable ways. As shown above, a gas pump 74 may draw in air through an air inlet 73 to generate the desired pulsed or continuous gas flow. In an alternative embodiment, which is schematically depicted in FIG. 5, the gas flow source 70 comprises the gas pump 74 fluidly coupled to a gas reservoir 72 such as a gas canister containing gas used to generate the gas pressure in the tubing 71. In this embodiment, the gas pump 74 may be replaced by a valve or the like or control of the controller 50 in case the gas canisters 72 is pressured such that a separate pump may not be required.

Figure 7:
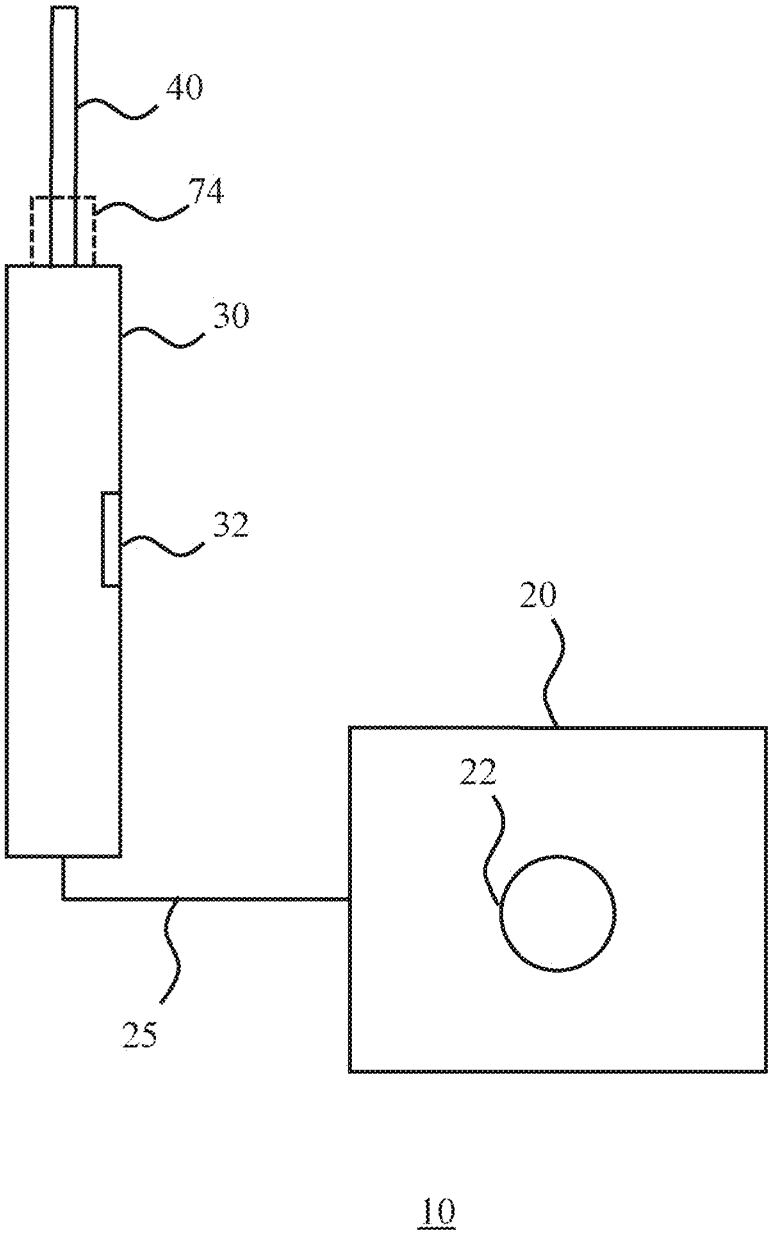
FIG. 7 schematically depicts an aspect of a subgingival cleaning system according to yet another embodiment.
Figure 8:
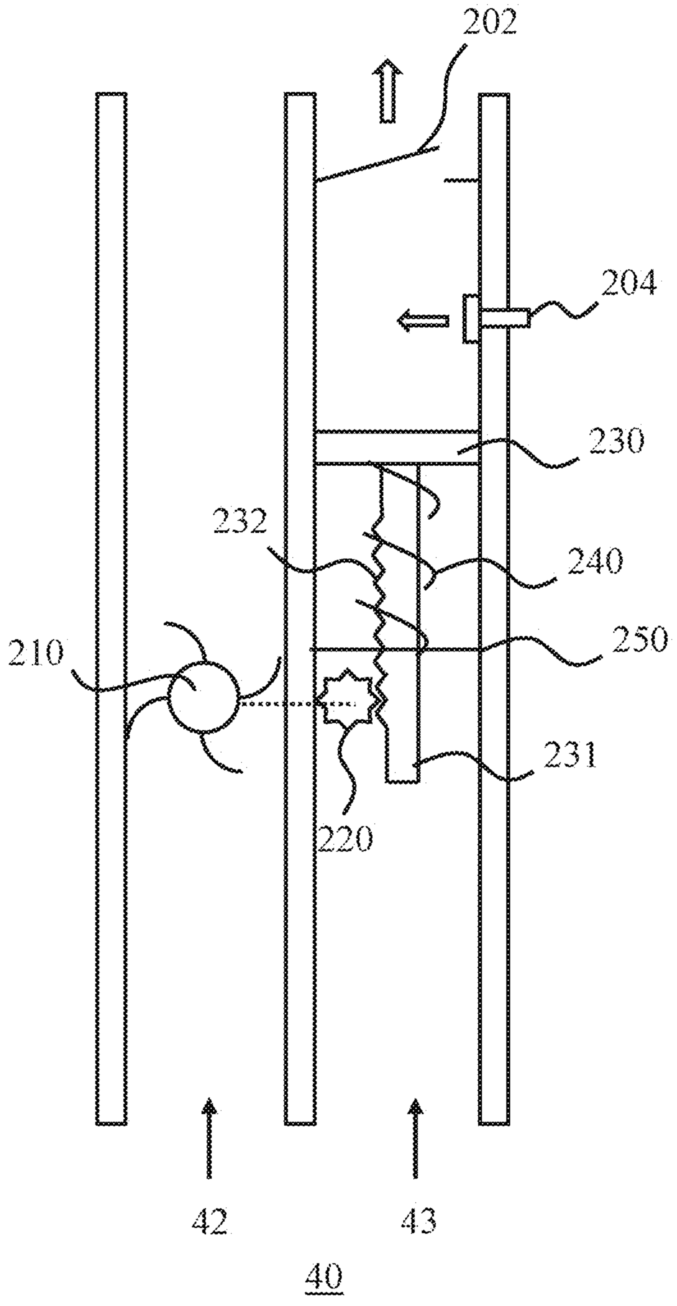
FIG. 8 schematically depicts a subgingival cleaning system according to an alternative embodiment.

In a further embodiment, which is schematically depicted in FIG. 7, the air pump 74 may form part of the nozzle arrangement 40, which nozzle arrangement 40 may be detachable such that the nozzle arrangement 40 can be attached to an existing oral hygiene device such as a water irrigation jet apparatus. A battery (not shown) may be incorporated in this nozzle arrangement 40 to power the gas pump 74. This embodiment for example is particularly feasible where the gas pump 74 is to provide a continuous gas stream, with the controller 50 only controlling the liquid flow source 70 to produce the previously described liquid pulse train. Alternatively, the gas pump 74 in this embodiment may comprise an air piston driven by the liquid pressure generated through the nozzle arrangement 40 by the liquid pump 64, such that an air pulse is formed ahead of each water pulse, thereby forming the fluid stream consisting of alternating liquid/air pulses. This is schematically depicted in FIG. 8, in which the first nozzle 42 comprises an impeller 210 driving a gear 220 in the second nozzle 43, which gear 220 is coupled to a serrated or toothed edge of the stem 231 of the plunger 232. A spring 240 is coiled around the stem 231 and extends between the head of the plunger 230 and the stop 250. The second nozzle 43 further comprises a first one-way valve 202 acting as a pressure release valve arranged proximal to its orifice and a second one-way valve 204 extending through the wall of the second nozzle 43 and acting as an air inlet valve, which second one-way valve 204 is located in between the first one-way valve 202 and the plunger 230.

In operation, a liquid pulse flowing through the first nozzle 42 acting as a conduit for the liquid pulses spins the impeller 210, which in turn drives the gear 220, causing the plunger 230 to be drawn towards the stop 250 within the second nozzle 43 acting as a compartment for generating a stream of air pulses, thereby compressing the coiled spring 240. The suction thus created with the plunger 230 closes the first one-way valve 202 and draws air into the (expanding) volume within the second nozzle 43 between the first one-way valve 202 and the plunger 230. The force exerted by the liquid pulse on the impeller 210 is typically larger than the compression force of the coiled spring 240, such that during the flowing of the liquid pulse the coiled spring 240 remains compressed and the plunger remains energized against the stop 250. Upon termination of the liquid pulse, the impeller 210 no longer is driven by the liquid pressure, and consequentially the energy stored in the coiled spring 240 is released causing the gear 220 to rotate in the opposite direction, i.e. causing the release of the plunger 230, which forces the air in the aforementioned volume within the second nozzle 43 to be expelled therefrom by the second one-way valve 204 shutting and the first one-way valve 202 opening, thereby generating an air pulse exiting the second nozzle 43 through its orifice.

Figures 9A, 9B:
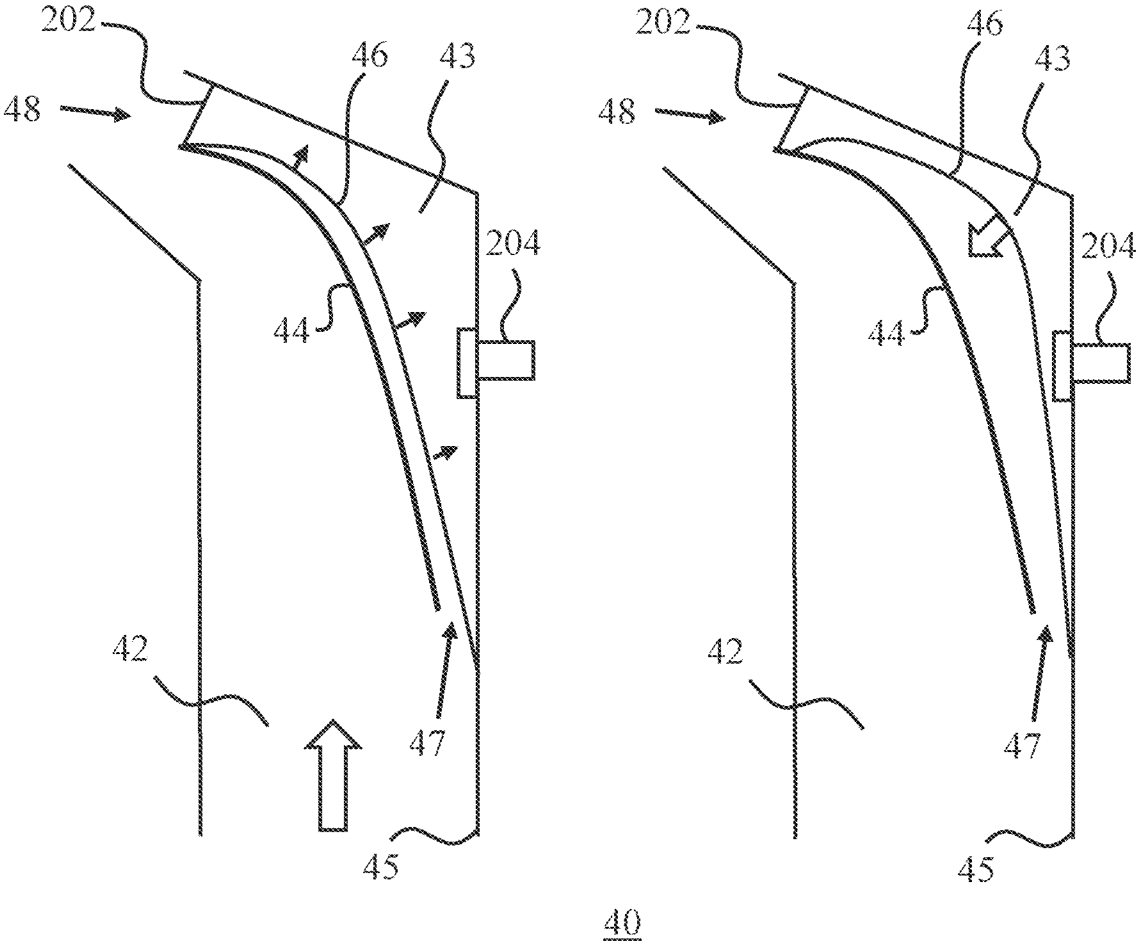
FIG. 9A depicts flow of a liquid pulse through the first nozzle and FIG. 9B depicts termination of the liquid pulse.

In another example embodiment, which is schematically depicted in FIG. 9, a flexible membrane 46 is attached to a partition wall 44 between the first nozzle 42 acting as a conduit for the liquid pulses and the second nozzle 43 acting as a compartment in which air pulses are generated proximal to the orifice 48 of the nozzle arrangement 40 and to the outer wall 45 of the nozzle arrangement 40 such as to provide an access 47 to the space in between the partition wall 44 and the flexible membrane 46. As before, the second nozzle 43 comprises a first one-way valve 202 arranged proximal to the nozzle orifice 48 and a second one-way valve 204 extending through the external wall 45 through which air can enter the second nozzle 43. During the flow of a liquid pulse through the first nozzle 42 (FIG. 9A) as indicated by the block arrow, the liquid pulse pressure causes some of the liquid to enter the space in between the partition wall 44 and the flexible membrane 46, thereby expanding this space, which causes the flexible membrane 46 to exert a positive pressure on the air within the second nozzle 43, thus triggering the opening of the first one-way valve 202 and expulsion of an air pulse out of the nozzle arrangement 40 through its orifice 48, whilst at the same time shutting the second one-way valve 204 through which air can enter the second nozzle 43.

Upon termination of the liquid pulse (FIG. 9B), the stretched membrane 46 exerts a positive pressure on the liquid within the space in between the partition wall 44 and the flexible membrane 46, thus forcing this liquid from this space into the first nozzle 42 through access 47. Consequently, the pressure within the second nozzle 43 drops, causing the shutting of the first one-way valve 202 and opening of the second one-way valve 204 to allow air to enter the second nozzle 43, which typically occurs when the internal pressure within the second nozzle 43 drops below atmospheric pressure. In this manner, a stream of air pulses partially overlapping with the liquid pulses can be generated, such that after each liquid pulse, a tail of the air pulse can remove the liquid column from the periodontal pocket.

These example embodiments of the nozzle arrangement 40 therefore allow existing subgingival cleaning systems capable of generating a stream of liquid pulses to be adapted such that the liquid pulses are separated by air, e.g. a continuous air stream or a pulsed air stream, in order to remove the liquid column from the periodontal pocket to be cleaned. In such a nozzle arrangement 40, the first nozzle 42 typically acts as the conduit for the liquid pulses and the second nozzle 43 typically acts as the compartment in which the air pulses are created. This compartment typically comprises some pressuring arrangement responsive to liquid pressure generated by said liquid pulses, e.g. the plunger 230 or the flexible membrane 46, for pressuring the air within the compartment in order to generate a stream of air pulses through the pressure release valve 202, with each air pulse at least partially following one of said liquid pulses. For example, in the plunger embodiment of FIG. 8, the air pulses are substantially temporally distinct from the liquid pulses, wherein in the flexible membrane embodiment in FIG. 9, the air pulses temporally overlap with the liquid pulses. In the latter embodiment it has been found that the non-overlapping tail of the air pulses can still effectively remove at least some of the liquid column from the periodontal pocket and improve cleaning performance of a subgingival cleaning device that deploys liquid pulses only.

Figure 10:
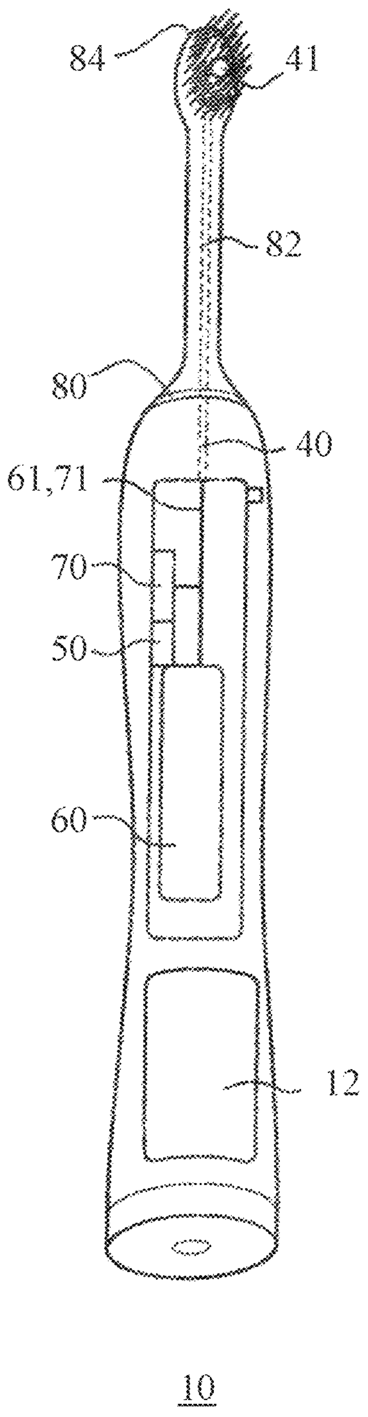
FIG. 10 schematically depicts another nozzle arrangement for converting an existing subgingival cleaning system into a subgingival cleaning system according to an example embodiment.

The subgingival cleaning system 10 of the present invention may take any suitable shape or form and is not limited to dedicated subgingival cleaning. For example, as schematically depicted in FIG. 10, the subgingival cleaning system 10 may be incorporated within an electric toothbrush, with the nozzle arrangement 40 extending through the stem 82 of a brush attachment 80, with the nozzle 41 terminating in the brush head 84 of the brush attachment 80. The battery compartment 12 may comprise a rechargeable battery arranged to power a motor (not shown) for driving the brush attachment 80, the controller 50, the liquid flow source 60, and where relevant, the gas flow source 70 in order to generate the fluid stream comprising the liquid pulses separated by air through the fluid conduits 61, 71 into the nozzle arrangement 40. As will be readily understood by the skilled person, although a single nozzle 41 is shown to terminate substantially centrally within the brush head 84, other arrangements, e.g. an arrangement in which dedicated nozzles for the pulsed liquid stream and the continuous or pulsed air stream terminate in any suitable location within the brush head 84 are equally feasible.

At this point it is further noted that the subgingival cleaning system 10 according to embodiments of the present invention may not be dedicated to subgingival cleaning, but instead may comprise a plurality of oral cleaning modes, e.g. a continuous irrigation mode and a pulsed irrigation mode in which liquid pulses are not separated by a gas stream or gas pulses, and so on. At least some of these other oral cleaning modes may not be aimed at subgingival cleaning.

Figure 11:
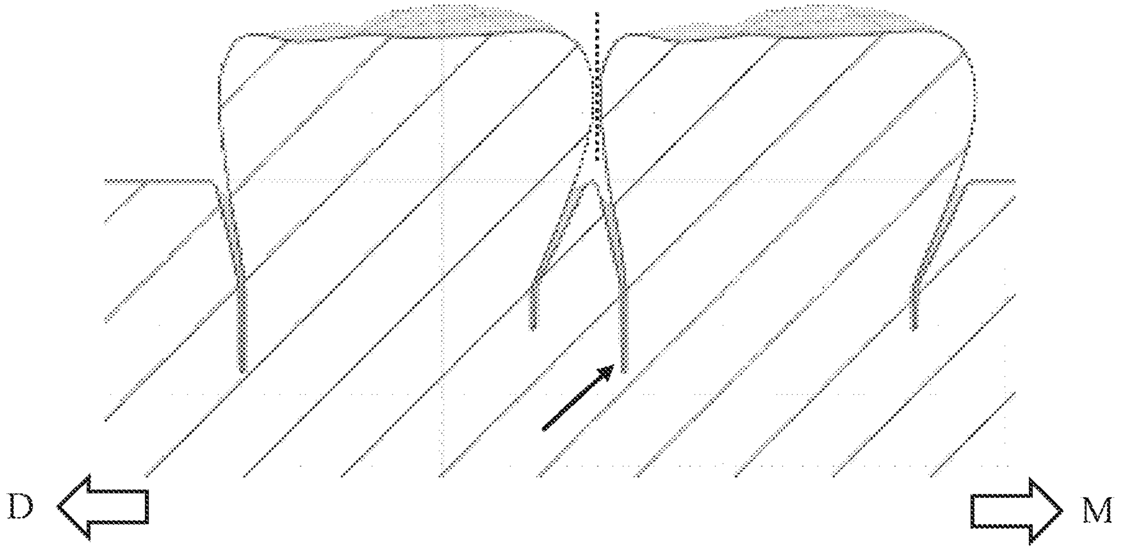
FIG. 11 schematically depicts the molar configuration used in a proof of concept computer simulation.

In order to demonstrate proof of concept, computational fluid dynamics were performed on a CAD model of a two molar pocket as shown in FIG. 11, with the mesial direction indicated by the block arrow labelled M and the distal direction indicated by the block arrow labelled D. The CAD model includes an interproximal periodontal pocket of 5 mm depth indicated by the arrow, with the remaining pocket surrounding the teeth having a depth of 3 mm. The interproximal periodontal pocket was set to have a width of 0.4 mm at the top of the pocket, which tapered down to 0.1 mm at the bottom of the pocket. The interdental plane between the two teeth is indicated by the dashed line.

In a first set of simulations, the efficiency of a waterjet producing a continuous water stream was simulated. Simulations were done using nozzles of different sizes with close to optimal aiming positions for cleaning the 5 mm deep interproximal pocket. For 0.8 and 0.3 mm diameter nozzles full pocket cleaning was achieved in about 0.92 and 2.33 s, respectively, using liquid volumes of 12.6 and 4.2 ml, respectively. For treating local pockets such treatment times and volumes may be fine. However, for cleaning a full set of teeth having up to 60 interproximal pockets, using a waterjet with nozzle diameter of 0.3 and 0.8 mm will require 140 & 55 s treatment time and 252 & 756 ml of volume of water, respectively. If also buccal and lingual sub-gingival areas are considered for cleaning, then the treatment time and volume of water required will further increase. Moreover, for buccal and lingual regions, the optimal aiming angle needs to be re-computed, which could lead to increase in treatment times. Such treatment times can further increase due to user behavior and tooth-pocket anatomies. Large liquid volumes and longer treatment times compromise the user experience, and as a consequence the compliance of the user with the required oral hygiene regime, which is key to achieving a true oral health solution. Therefore, there is a strong need for improving efficacy of jet pocket cleaning by achieving lower treatment times and required volume of water.

One of the findings from the first set of simulations is that the velocities of the liquid quickly decrease after entering the interproximal periodontal pocket. The liquid flow exits the nozzle at 25 m/s and then decelerates to less than 10 m/s at the bottom of the pocket. This is due to the fact that the jet has to penetrate a 5 mm high liquid column in the pocket, which causes a loss of momentum due to surface drag by the walls of the pocket and the liquid present in pocket, thus reducing the liquid velocity. Consequently, the resulting shear forces at the bottom of the pocket acting on biofilm decrease, leading to slower cleaning of the periodontal pocket.

Figure 12A:
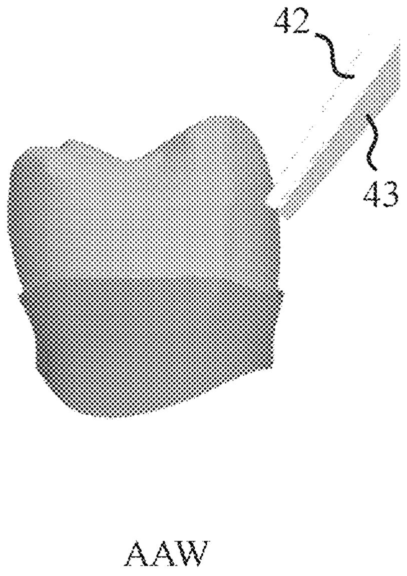
FIG. 12 schematically depicts the proof of concept simulation setup comparing the performance of a subgingival cleaning system according to an embodiment (FIG. 12A) with the performance of a waterjet (FIG. 12B)
Figure 12B:
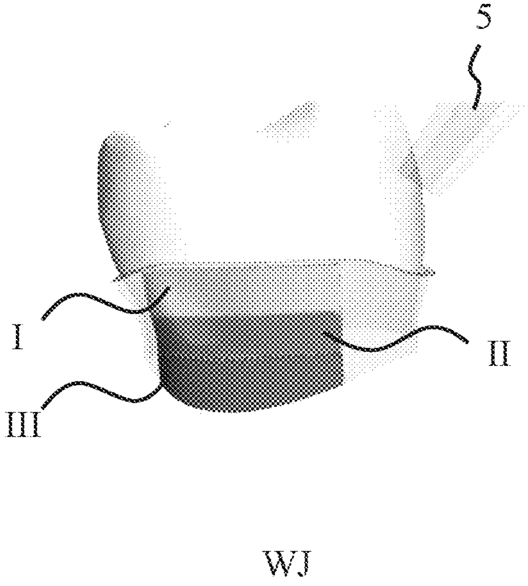

In a second set of simulations, the performance of a subgingival cleaning system 10 (labelled AAW; FIG. 12A) according to an embodiment of the present invention was compared against that of a continuous water jet (labelled WJ; FIG. 12B). This is schematically depicted in FIG. 12, in which the subgingival cleaning system 10 was configured with a pair of adjacent nozzles 42, 43, with the water nozzle having a diameter of 0.55 mm, identical to the diameter of the water jet nozzle 5. The air velocity from the adjacent air nozzle was set to 100 m/s (0.1 bar) at the nozzle exit, which proved to be sufficient to remove the fluid from the interproximal periodontal pocket. The pulse duration of the water pulse and the air pulse was set to 10 ms each, thus yielding a pulsed fluid stream with a 50 Hz cycle frequency. As shown in FIG. 12B, biofilm removal was established in three different regions of the interproximal periodontal pocket, i.e. the top (I) of the pocket spanning from 0-1.5 mm measured from the pocket entry point, the intermediate or middle part (II) of pocket spanning from 1.5-3 mm measured from the pocket entry point and the deep or bottom part (III) of the pocket spanning from 3-5 mm measured from the pocket entry point.

Figure 13:
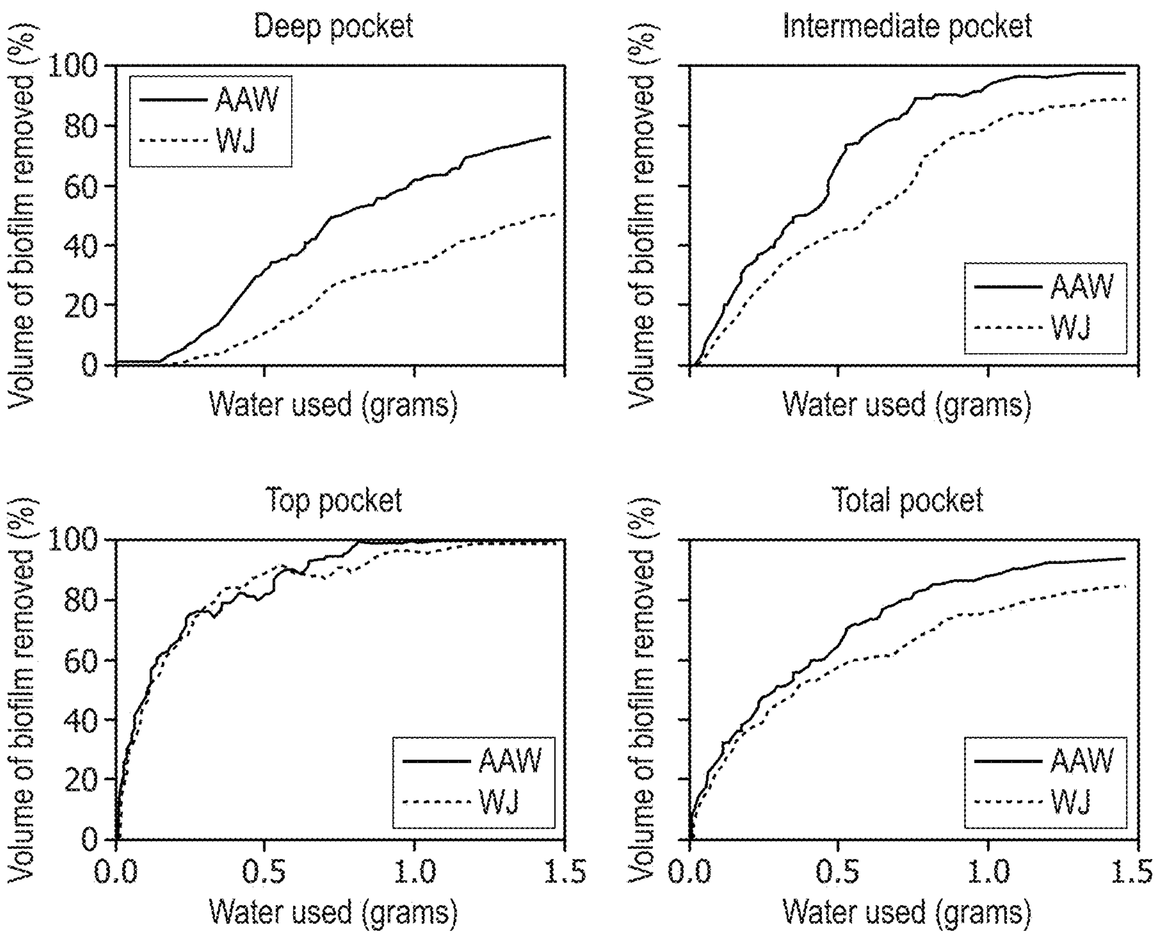
FIGS. 13 and 14 contains graphs depicting simulation results obtained with the simulation setup depicted in FIG. 12.
Figure 14:
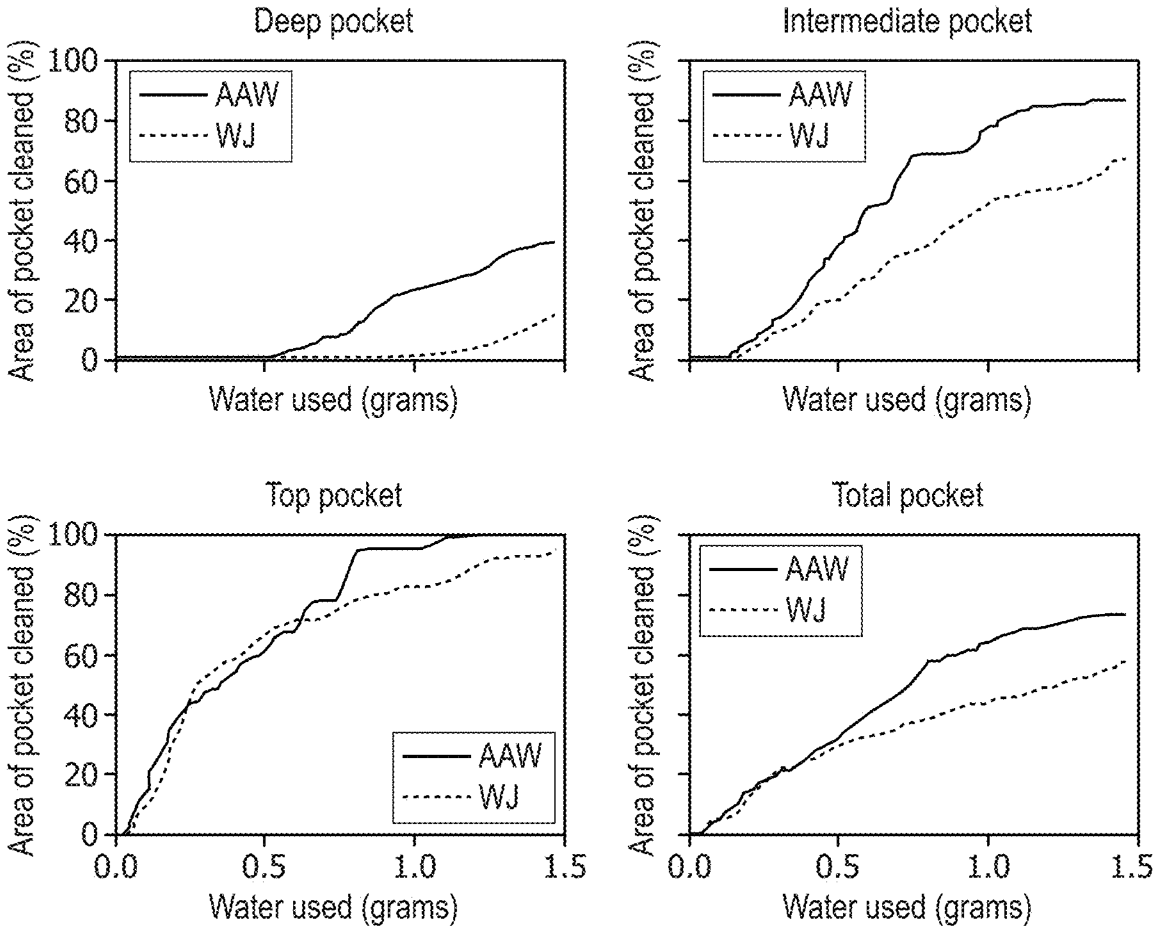

The results of these simulations are shown in FIG. 13, which depicts the volume of biofilm removed (y-axis, in %) as a function of water volume used (x-axis, in grams) for the deep pocket (top left), intermediate pocket (top right), top pocket (bottom left) and total pocket (bottom right). FIG. 14 depicts the area of the pocket that has been cleaned (y-axis, in %) as a function of water volume used (x-axis, in grams) for the deep pocket (top left), intermediate pocket (top right), top pocket (bottom left) and total pocket (bottom right). From these graphs, it can be clearly recognized that for the top pocket, both the subgingival cleaning system 10 according to an embodiment of the present invention and the continuous water jet achieve full removal of the biofilm with about 1 g (1 ml) of water. However, both for the intermediate and deep pockets, the subgingival cleaning system 10 achieves superior cleaning results, in particular for the deep pocket cleaning, where about 70% of biofilm was removed with 1.5 g (1.5 ml) water compared to less than 50% for the continuous waterjet when using the same amount of water. This equated to about 40% of the total area of the deep pocket being cleaned with the subgingival cleaning system 10 compared to about 15% of this total are being cleaned by the continuous water jet using the same amount of water. Hence, the removal of the water column from the periodontal pocket with gas (e.g. air) between liquid (e.g. water) pulses being fired into this pocket significantly improves the cleaning efficiency of the subgingival cleaning system 10 compared to a continuous water jet using the same nozzle diameter and water volumes. Consequently, effective periodontal cleaning can be achieved in a shorter period of time using less liquid (e.g. water) when using the subgingival cleaning system 10 instead of a continuous water jet.

Figure 15:
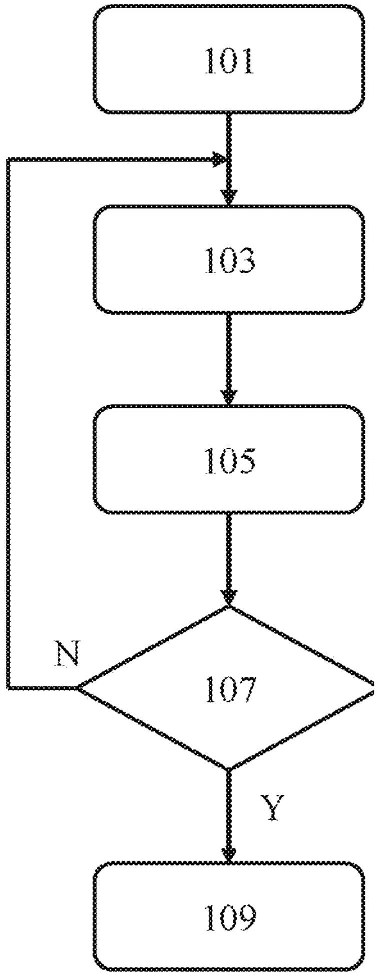
FIG. 15 is a flowchart of a subgingival cleaning method according to an embodiment.

FIG. 15 is a flowchart of a method 100 according to an embodiment, which is a method for effective subgingival cleaning, and which may be implemented in any suitable manner, e.g. by the subgingival cleaning system 10. The method 100 starts in operation 101, e.g. by a user enabling a device or system implementing the method 100. In operation 103, a liquid pulse having a duration in a range of 8-40 ms is aimed at the subgingival region to be cleaned, whereas in operation 105 gas is aimed at the subgingival region to be cleaned after each liquid pulse, after which the method 100 returns to operation 103 until it is decided in operation 107 that the fluid stream should be terminated, e.g. in response to a user command, after which the method 100 terminates in operation 109. The interval between the repetition of operation 103, i.e. the generation of subsequent liquid pulses, typically has a duration of 2-10 ms, which is sufficiently long for the gas in operation 105 to remove the liquid column from the periodontal pocket in the subgingival region to be cleaned, as previously explained. The gas provided in operation 105 may be provided as a continuous gas stream, or may comprise the generation of a gas pulse in between two liquid pulses, with the gas pulse having a duration of the interval between two subsequent liquid pulses, i.e. a duration in a range of 2-10 ms.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. Measures recited in mutually different dependent claims can advantageously be combined.

The invention claimed is:

1. A subgingival cleaning system comprising:

a liquid flow source and a gas flow source each coupled to a nozzle arrangement arranged to be aimed at a subgingival region to be cleaned, the nozzle arrangement comprising at least one nozzle; and a controller, wherein the controller is configured to operate such that:

the liquid flow source is arranged to produce a liquid flow comprising a series of liquid pulses through said nozzle arrangement;

the gas flow source is arranged to produce a gas flow through said nozzle arrangement such that each liquid pulse is followed by said gas flow, and the liquid pulses each have a duration of 5-100 ms, and the intervals between sequential liquid pulses each have a duration of 1-50 ms.

2. The subgingival cleaning system of claim 1, wherein said liquid pulses each have a duration of 8-40 ms, and the intervals between sequential liquid pulses each have a duration of 2-10 ms.

3. The subgingival cleaning system of claim 1, wherein the nozzle arrangement comprises a single nozzle.

4. The subgingival cleaning system of claim 3 wherein the liquid flow source and the gas flow source are fluidly coupled to the single nozzle via a switch arranged to switch between said liquid flow and said gas flow.

5. The subgingival cleaning system of claim 1, wherein the nozzle arrangement comprises a first nozzle fluidly coupled to the liquid flow source and a second nozzle fluidly coupled to the gas flow source.

6. The subgingival cleaning system of claim 5, wherein the nozzle arrangement comprises a concentric nozzle arrangement in which one of the first nozzle and second nozzle envelopes the other of the first nozzle and second nozzle.

7. The subgingival cleaning system of claim 1, wherein the gas flow from the gas flow source comprises a plurality of gas pulses, each gas pulse at least partially following one of said liquid pulses.

8. The subgingival cleaning system of claim 5, wherein the gas flow from said gas flow source is a continuous gas stream.

9. The subgingival cleaning system of claim 1, wherein the liquid is water and/or the gas is air.

10. The subgingival cleaning system of claim 1, wherein the liquid flow source comprises a liquid reservoir fluidly coupled to the nozzle arrangement through a fluidic coupling comprising a liquid pump.

11. The subgingival cleaning system of claim 10, wherein:

said fluidic coupling, the liquid flow source and the nozzle arrangement are non-expandable and/or the fluidic coupling comprises an active stop under control of the controller to terminate a liquid stream from the liquid flow source to the nozzle arrangement.

12. The subgingival cleaning system of claim 1, wherein the gas flow source comprises an air piston within the nozzle arrangement, said air piston being driven by liquid pressure generated by said liquid flow source causing said air piston to draw air into the nozzle arrangement.

13. The subgingival cleaning system of claim 1, wherein the gas flow source comprises a gas pump or a gas canister.

14. The subgingival cleaning system of claim 13, wherein the gas pump is integrated in the nozzle arrangement.

15. A nozzle arrangement for a subgingival cleaning system arranged to generate a stream of liquid pulses, the nozzle arrangement comprising a conduit for receiving said liquid pulses and a compartment comprising an air inlet valve and a pressure release valve, each of the conduit and the compartment terminating in an orifice of the nozzle arrangement, wherein the compartment comprises a pressuring arrangement responsive to liquid pressure generated by said liquid pulses for pressuring the air within the compartment in order to generate a stream of air pulses through said pressure release valve, each air pulse at least partially following one of said liquid pulses, wherein the nozzle arrangement is adapted to produce a flow comprising a series of liquid pulses of duration of 5-100 ms with the intervals between subsequent liquid pulses with a duration of 1-50 ms, each liquid pulse being followed by an air pulse.

* * * * *